United States Patent
Smith et al.

(10) Patent No.: US 11,470,629 B1
(45) Date of Patent: Oct. 11, 2022

(54) DELAY-RESPONSIVE UPLINK SCHEDULING

(71) Applicant: Cisco Technology, Inc., San Jose, CA (US)

(72) Inventors: Malcolm M. Smith, Richardson, TX (US); Sanjay K. Katabathuni, Fremont, CA (US); Venkataprasad Chirreddy, Milpitas, CA (US); Guru Prasanna Gopalakrishnan, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 12 days.

(21) Appl. No.: 17/125,811

(22) Filed: Dec. 17, 2020

Related U.S. Application Data

(60) Provisional application No. 63/073,346, filed on Sep. 1, 2020.

(51) Int. Cl.
*H04W 72/12* (2009.01)
*H04W 28/02* (2009.01)

(52) U.S. Cl.
CPC ... *H04W 72/1268* (2013.01); *H04W 28/0278* (2013.01); *H04W 72/1252* (2013.01); *H04W 72/1257* (2013.01)

(58) Field of Classification Search
CPC ......... H04W 72/1268; H04W 28/0278; H04W 72/1252; H04W 72/1257
See application file for complete search history.

(56) References Cited

U.S. PATENT DOCUMENTS

| | | |
|---|---|---|
| 2009/0196275 A1 | 8/2009 | Damnjanovic et al. |
| 2010/0329198 A1 | 12/2010 | Madan et al. |
| 2011/0130098 A1* | 6/2011 | Madan .................. H04W 24/02 455/63.1 |
| 2011/0130099 A1* | 6/2011 | Madan .............. H04W 72/1226 455/63.1 |
| 2017/0099615 A1 | 4/2017 | Tesanovic et al. |
| 2017/0202005 A1* | 7/2017 | Madan .............. H04W 72/1231 |
| 2019/0090229 A1 | 3/2019 | Iwai et al. |
| 2021/0037412 A1* | 2/2021 | Changlani ......... H04W 74/0833 |
| 2021/0175961 A1* | 6/2021 | Liu ..................... H04W 56/006 |
| 2022/0038945 A1* | 2/2022 | Dalmiya ................ G06N 20/00 |

OTHER PUBLICATIONS

K. V. Pradap, V. Ramachandran and S. Kalyanasundaram, "Uplink Buffer Status Reporting for Delay Constrained Flows in 3GPP Long Term Evolution," 2009 IEEE Wireless Communications and Networking Conference, Budapest, 2009, pp. 1-6, doi: 10.1109/WCNC.2009.4918010.
Akash Baid, Ritesh Madan, Ashwin Sampath, "Delay Estimation and Fast Iterative Scheduling Policies for LTE Uplink," Jan. 16, 2012 (arxiv.org).
U.S. Appl. No. 16/655,005, filed Oct. 19, 2019.

\* cited by examiner

*Primary Examiner* — Ajay Cattungal
(74) *Attorney, Agent, or Firm* — Patterson + Sheridan, LLP

(57) ABSTRACT

A method includes receiving, at an access point, a buffer status report from a device wirelessly connected to the access point. The buffer status report indicates a queue depth of the device and a head of line delay for the device. The method further includes scheduling uplink resources at the access point for the device based on the queue depth and the head of line delay.

17 Claims, 4 Drawing Sheets

DELAY-RESPONSIVE UPLINK SCHEDULING

RELATED APPLICATION AND CLAIM TO PRIORITY

This application claims priority to U.S. Provisional Application No. 63/073,346 filed Sep. 1, 2020 and titled "DELAY-RESPONSIVE UPLINK SCHEDULING," which is incorporated herein by reference.

TECHNICAL FIELD

Embodiments presented in this disclosure generally relate to scheduling uplink resources for devices.

BACKGROUND

Devices connect to networks (e.g., cellular networks, the Internet, home networks, etc.) via access points (e.g., routers, modems, base stations, network nodes, etc.). The access points may schedule communication resources to the devices so that the devices can send and receive communications from the network. One way that the access point determines what resources to provide a device is through a buffer status report (BSR) communicated by the device to the access point. In conventional networks, the BSR included an indication of how much data the device needs to send over the network, which is referred to as queue depth. Based on that information, the access point would determine a priority for the device and schedule communication resources for the device. Stated differently, the access point assumed that the queue depth reflected the device's demand for communication resources.

This approach, however, has certain shortcomings. For example, voice or video applications may communicate non-continuous packet flows that result in a low queue depth. As a result, these voice and video applications may not be provided communication resources frequently enough to maintain a sufficient quality of video or voice. As another example, access points may poll the devices connected to the access point sequentially for BSRs. If a packet enters a device's queue right after the device communicates the latest BSR to the access point, that packet waits in the queue until the next time the access point polls the device, resulting in delay.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method that includes receiving a buffer status report from a device. The buffer status report indicates a queue depth of the device and a head of line delay for the device. The method further includes scheduling uplink resources for the device based on the queue depth and the head of line delay.

Example Embodiments

This disclosure describes an approach to scheduling communication resources (e.g., uplink resources) for a device. Generally, the device includes a head of line (HOL) delay in the BSRs transmitted by the device. The HOL delay indicates an amount of time that a packet in the device's queue has waited for transmission. The access point then uses the HOL delay and/or the queue depth in the BSR to schedule communication resources to the device. For example, the access point may adjust a BSR polling frequency for the device based on the HOL delay in the BSR. In this manner, the access point can base its scheduling decisions on the amount of data awaiting transmission and the amount of delay experienced by that data. In particular embodiments, this approach reduces delay and allows video and voice applications to experience a higher quality of service. This approach will be described in more detail using FIGS. 1 through 4.

Figure 1:
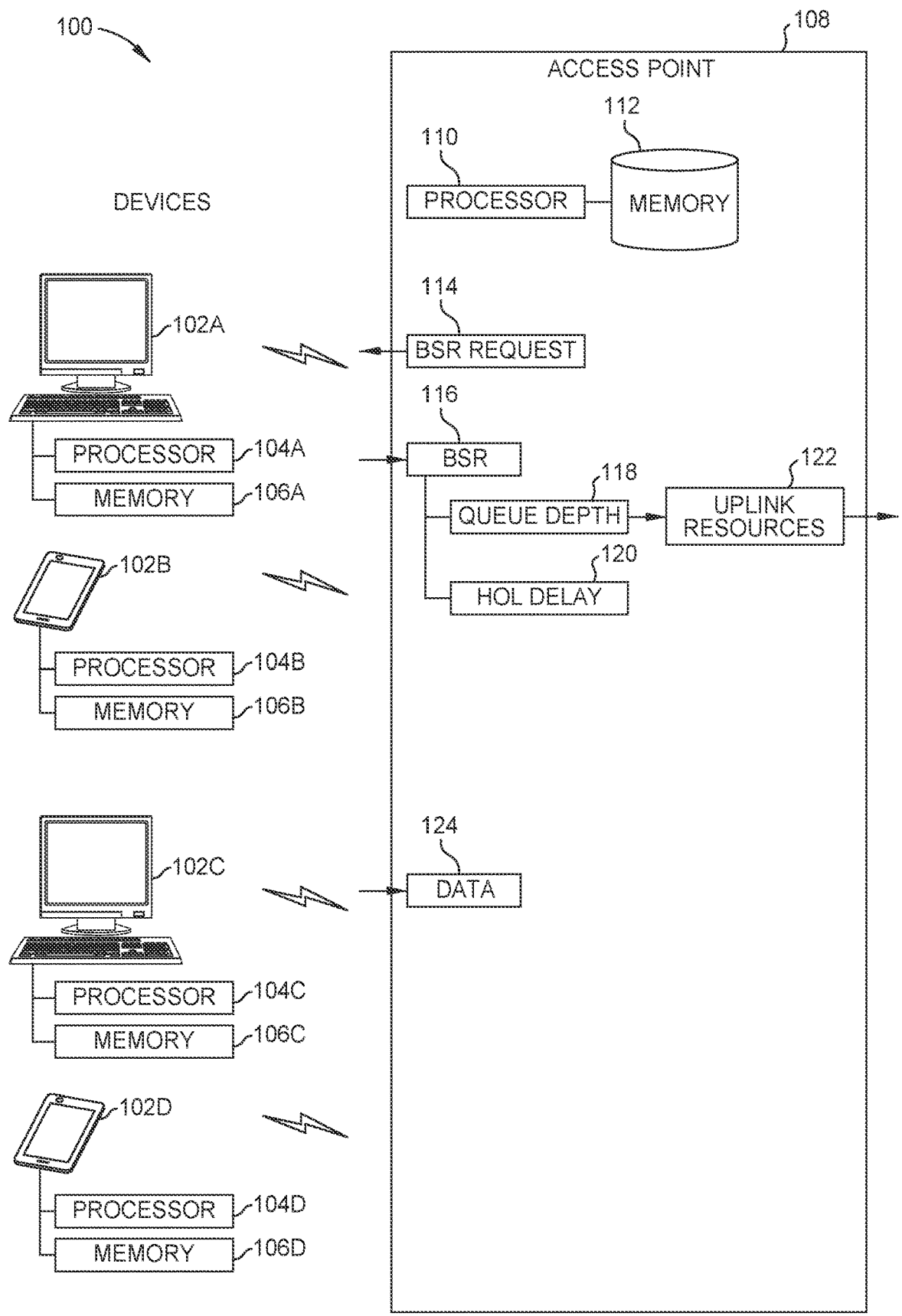
FIG. 1 illustrates an example communications system, according to one or more embodiments.

FIG. 1 illustrates an example communications system 100. As seen in FIG. 1, system 100 includes one or more devices 102 and an access point 108. Generally, the access point 108 schedules communication resources (e.g., uplink resources) to the devices 102, and the devices 102 communicate data to the access point 108 for transmission. In particular embodiments, the access point 108 schedules communication resources to the devices 102 by considering the HOL delay and/or queue depth of the devices 102, which reduces delay and provides for a higher quality of service (e.g., for video and voice applications).

The devices 102 are used to communicate with other portions of a network via the access point 108. Stated differently, the devices 102 communicate information to the access point 108 so that the access point 108 may forward that information to other portions of a network (e.g., other network nodes or other devices 102). For example, the devices 102 may send video or voice data to the access point 108 for transmission to other devices 102. These devices 102 may communicate information to the access point 108 according to communication resources (e.g., uplink resources) scheduled by the access point 108.

The system 100 may include any suitable number of devices 102. In the example of FIG. 1, the system 100 includes devices 102A, 102B, 102C, and 102D. Each device 102 includes a processor 104 and a memory 106. Device 102A includes processor 104A and memory 106A. Device 102B includes processor 104B and memory 106B. Device 102C includes processor 104C and memory 106C. Device 102D includes processor 104D and memory 106D. The processors 104 and memories 106 may be configured to perform any of the functions and actions of the devices 102 described herein.

A processor 104 is any electronic circuitry, including, but not limited to microprocessors, application specific integrated circuits (ASIC), application specific instruction set processor (ASIP), and/or state machines, that communicatively couples to a memory 106 and controls the operation of a device 102. The processor 104 may be 8-bit, 16-bit, 32-bit, 64-bit or of any other suitable architecture. The processor 104 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 104 may include other hardware that operates software to control and process information. The processor 104 executes software stored on memory to perform any of the functions described herein. The processor 104 controls the operation and administration of a device 102 by processing information received from other components, such as the access point 108 or the memory 106. The processor 104 may be a programmable logic device, a microcontroller, a microprocessor, any suitable processing device, or any suitable combination of the preceding. The processor 104 is not limited to a single processing device and may encompass multiple processing devices.

The memory 106 may store, either permanently or temporarily, data, operational software, or other information for the processor 104. The memory 106 may include any one or a combination of volatile or non-volatile local or remote devices suitable for storing information. For example, the memory 106 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 106, a disk, a CD, or a flash drive. In particular embodiments, the software may include an application executable by the processor 104 to perform one or more of the functions described herein.

The devices 102 include any appropriate device for communicating with components of system 100. As an example and not by way of limitation, device 102 may be a computer, a laptop, a wireless or cellular telephone, an electronic notebook, a personal digital assistant, a tablet, or any other device capable of receiving, processing, storing, and/or communicating information with other components of system 100. Device 102 may also include a user interface, such as a display, a microphone, keypad, or other appropriate terminal equipment. Device 102 may include a hardware processor, memory, and/or circuitry configured to perform any of the functions or actions of device 102 described herein. For example, a software application designed using software code may be stored in the memory and executed by the processor to perform the functions of device 102.

The access point 108 may be any suitable component that allows the devices 102 to connect to other portions of a network. For example, the access point 108 may be a router, modem, gateway, switch, base station, cellular tower, or any other network node. The network may be any suitable network operable to facilitate communication between the components of system 100. The network may include any interconnecting system capable of transmitting audio, video, signals, data, messages, or any combination of the preceding. The network may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. The network and/or the access point 108 may adhere to any suitable communication standard. For example, the access point 108 may be a component in a residential or corporate internet network (e.g., Wifi4, WiFi5, or WiFi6 network). As another example, the access point 108 may be a component in a cellular network (e.g., 3G, 4G, or 5G network)

As seen in FIG. 1, the access point 108 includes a processor 110 and a memory 112, which may be configured to perform any of the functions of the access point 108 described herein. Generally, the access point 108 controls the communication of packets from a device 102 to other portions of the network, and vice versa. For example, the access point 108 schedules communication resources (e.g., uplink and/or downlink resources) to the device 102. The device 102 then communicates and/or receives packets through the access point 108 according to these scheduled resources.

The processor 110 is any electronic circuitry, including, but not limited to microprocessors, application specific integrated circuits (ASIC), application specific instruction set processor (ASIP), and/or state machines, that communicatively couples to the memory 112 and controls the operation of the access point 108. The processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 110 may include other hardware that operates software to control and process information. The processor 110 executes software stored on memory to perform any of the functions described herein. The processor 110 controls the operation and administration of the access point 108 by processing information received from other components, such as a device 102 or the memory 112. The processor 110 may be a programmable logic device, a microcontroller, a microprocessor, any suitable processing device, or any suitable combination of the preceding. The processor 110 is not limited to a single processing device and may encompass multiple processing devices.

The memory 112 may store, either permanently or temporarily, data, operational software, or other information for the processor 110. The memory 112 may include any one or a combination of volatile or non-volatile local or remote devices suitable for storing information. For example, the memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 112, a disk, a CD, or a flash drive. In particular embodiments, the software may include an application executable by the processor 110 to perform one or more of the functions described herein.

As discussed above, the access point 108 performs an unconventional process to schedule communication resources (e.g., uplink resources) for one or more devices 102. Generally, the access point 108 considers a head of line (HOL) delay and/or a queue depth provided by a device 102 in determining how to schedule communication resources for the device 102. In this manner, the access point 108 reduces delay and provides for a higher quality of service, especially for video and voice application, in certain embodiments.

The access point 108 receives a BSR 116 from a device 102. In some embodiments, the device 102 communicated the BSR 116 to the access point 108 periodically. In certain embodiments, the device 102 communicates the BSR 116 to the access point 108 in response to the access point 108 polling the device 102. For example, the access point 108 may communicate a BSR request 114 to the device 102 at periodic intervals according to a polling frequency for the device 102. When the device 102 receives the BSR request 114, the device 102 communicates the BSR 116 to the access point 108. In certain embodiments, the access point 108 polls the devices 102 in the system 100 sequentially. For example, the access point 108 may communicate a BSR request 114 to a device 102A and receive a BSR 116 from the device 102A. The access point 108 may then communicate a BSR request 114 to a device 102B and receive a BSR 116 from the device 102B. This process continues until the access point 108 finishes polling each device 102 connected to the access point 108. The access point 108 then returns to the beginning of the sequence and polls the device 102A. In conventional access points, the sequential polling may result in a packet being delayed at a device 102. For example, if a packet at a device 102 is ready for communication soon after the device is polled and communicates a BSR 116, then the packet will need to wait at the device 102 until the next time the access point 108 polls the device 102. If the access point 108 determines that the traffic demand of the device 102 is low, then the access point 108 may poll the device 102 less frequently, which results in an even longer delay for the packet.

The access point 108 considers the information in the BSR 116 to determine how to schedule communication resources for the device 102 that communicated the BSR 116. The BSR 116 may include information such as a queue depth 118 and a HOL delay 120 for the device 102. The queue depth 118 indicates an amount of data that is awaiting transmission from the device 102. The HOL delay 120 indicates an amount of time that that data has waited to be communicated. In certain embodiments, the HOL delay 120 indicates the amount of time that the oldest data packet awaiting transmission has waited. Using this information, the access point 108 schedules uplink resources 122 for the data packets awaiting transmission from the device 102. The access point 108 then communicates an indication of the scheduled uplink resources 122 to the device 102. The device 102 then communicates data 124 to the access point 108 according to the scheduled uplink resources 122. Specific techniques for scheduling the uplink resources 122 are described In more detail using FIGS. 2 through 4.

As an example, the access point 108 may schedule more uplink resources to a device 102 if that device 102 has a long HOL delay 120, indicating that packets at the device 102 have waited a long time for transmission. On the other hand, the access point 108 may schedule fewer uplink resources to a device 102 if that device 102 has a short HOL delay 120, indicating that packets at the device 102 have waited a short time for transmission. In this manner, the access point 108 may schedule uplink transmissions for packets with long HOL delays 120 even if the queue depth 118 is not high. This type of situation may commonly arise in video and voice applications. By scheduling uplink resources for devices 102 with high HOL delays 120 and low queue depth 118, the access point 108 may provide for a better quality of service for voice and video applicants relative to conventional access points.

Stated differently, by considering the HOL delay 120 in scheduling uplink resources 122, the access point 108 may reduce delay and provide a higher quality of service over implementations that consider only the queue depth 118 but not the HOL delay 120. For example, video and voice applications may use non-continuous packet flows that result in low queue depths 118. If the access point 108 considered only the queue depth 118 as a measure of demand for communication resources, then the access point 108 may not schedule uplink resources 122 frequently enough for the video or voice application. As a result, the data packets for the video or voice application wait in the device's 102 queue, resulting in delay. This delay may cause the video or voice application to stutter or freeze, reducing the quality of service of the application. By considering the HOL delay 120 in scheduling communication resources, the access point 108 may determine that data packets (e.g., video and voice data packets) have been awaiting a long amount of time even though the queue depth 118 is not high. In response, the access point 108 may schedule uplink resources 122 to these data packets to maintain a certain quality of service for the data packets. In this manner, the data packets are not forced to wait in queue until the queue depth 118 grows larger.

Figure 2:
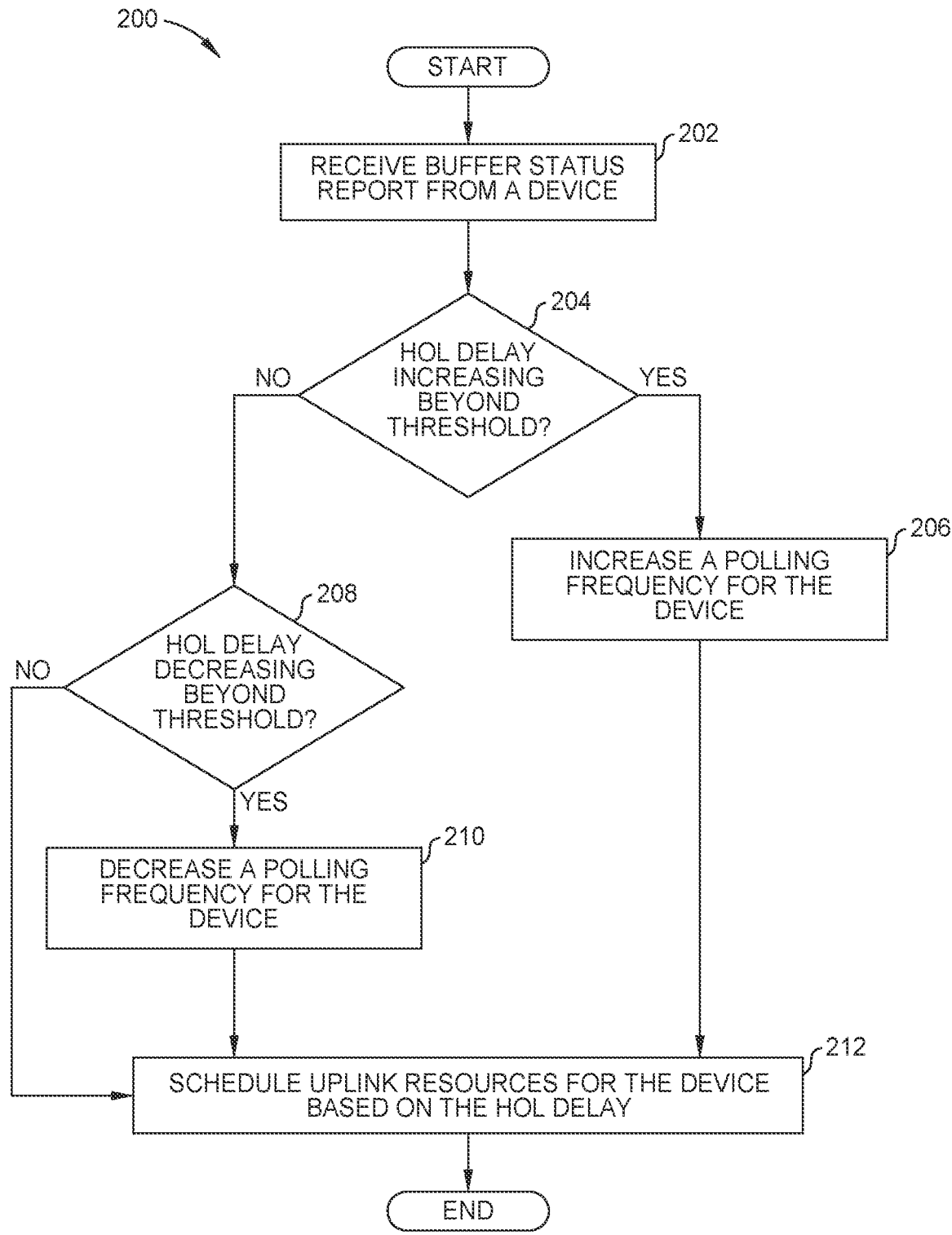
FIG. 2 is a flowchart of a process for scheduling uplink resources using the system of FIG. 1, according to one or more embodiments.

FIG. 2 is a flowchart of a process 200 for scheduling uplink resources 122 using the system 100 of FIG. 1. Generally, the access point 108 performs process 200. In particular embodiments, by performing process 200, the access point 108 reduces delay and provides for a higher quality of service, especially for video and voice applications.

In step 202, the access point 108 receives a BSR 116 from a device 102. In some embodiments, the device 102 communicates the BSR 116 periodically. In some embodiments, the device 102 communicates the BSR 116 in response to a BSR request 114 communicated by the access point 108. The access point 108 may have communicated the BSR request 114 to the device 102 according to a particular polling frequency for the device 102. In conventional access points, the sequential polling of devices 102 may result in packet delay. For example, if a packet at a device 102 is ready for transmission shortly after the device 102 is polled and communicates a BSR 116, then that packet will need to wait at the device 102 until the next time the access point polls the device 102. If the access point determines that the device 102 should be polled less frequently because the device 102 has a low queue depth 118, then the packet may wait even longer for transmission. Contrary to conventional access points, the access point 108 receives BSRs 116 that include the HOL delay 120 of the devices 102. The access point 108 may use the HOL delay 120 to determine when and how much uplink resources to schedule for a device 102. In this manner, the device 102 may be given uplink resources to transmit packets when HOL delay 120 is high and queue depth 118 is low.

In step 204, the access point 108 determines whether a HOL delay 120 in the BSR 116 is increasing beyond a threshold. For example, the access point 108 may determine whether the HOL delay 120 is increasing at a rate that exceeds a threshold rate. As another example, the access point 108 may determine whether the HOL delay 120 has increased above a threshold delay value. If the HOL delay 120 is increasing beyond a threshold, then the device 102 may be holding delayed packets. Providing the device 102 with uplink resources to transmit those packets may provide the device 102 with a higher quality of service. The access point 108 may track the HOL delay 120 across multiple BSRs 116 from the device 102 to determine how the HOL delay 120 is changing. If the HOL delay 120 is increasing beyond the threshold, the access point 108 increases a polling frequency for the device 102 in step 206. By increasing the polling frequency for the device 102, the access point 108 will begin sending BSR requests 114 to the device 102 more frequently. As a result, the device 102 is given more opportunities to send BSRs 116 to the access point 108 and receives more frequently scheduled uplink resources 122. In this manner, the device 102 is allowed to transmit data 124 more often, which reduces the HOL delay 120 for the device 102.

If the HOL delay 120 is not increasing beyond a threshold, then the access point 108 determines whether the HOL delay 120 is decreasing beyond a threshold in step 208. A decreasing HOL delay 120 may indicate that the device 102 is experiencing less demand for communication resources (e.g., because a user of the device 102 is using the device less or because the device 102 is being provided more uplink resources that the device 102 needs to sufficiently handle its communication needs). If the HOL delay 120 is decreasing beyond a threshold, the access point decreases a polling frequency for the device 102 in step 210. By decreasing the polling frequency for the device 102, the access point 108 will begin sending BSR requests 114 to the device 102 less frequently. As a result, the device 102 is given fewer opportunities to send BSRs 116 to the access point 108 and receives scheduled uplink resources 122 less frequently. In this manner, the device 102 is allowed to transmit data 124 less often, which increases the HOL delay 120 for the device 102.

The access point 108 then schedules uplink resources 122 for the device 102 based on the HOL delay 120 in step 212. For example, if the HOL delay 120 exceeds a threshold, it may indicate that the device 102 has packets that have been delayed a long period of time. To provide a high quality of service to the device 102, the access point 108 may schedule more uplink resources 122 to the device 102 when the HOL delay 120 exceeds the threshold. As another example, if the HOL delay 120 does not exceed the threshold, it may indicate that the device 102 has sufficient uplink resources to handle the packet load at the device 102. In response, the access point 108 may not schedule additional uplink resources 122 for the device 102. By scheduling the uplink resources 122, the device 102 is allowed to transmit data 124 to the access point 108. The access point 108 then transmits the data 124 to other portions of the network according to the scheduled uplink resources.

Figure 3:
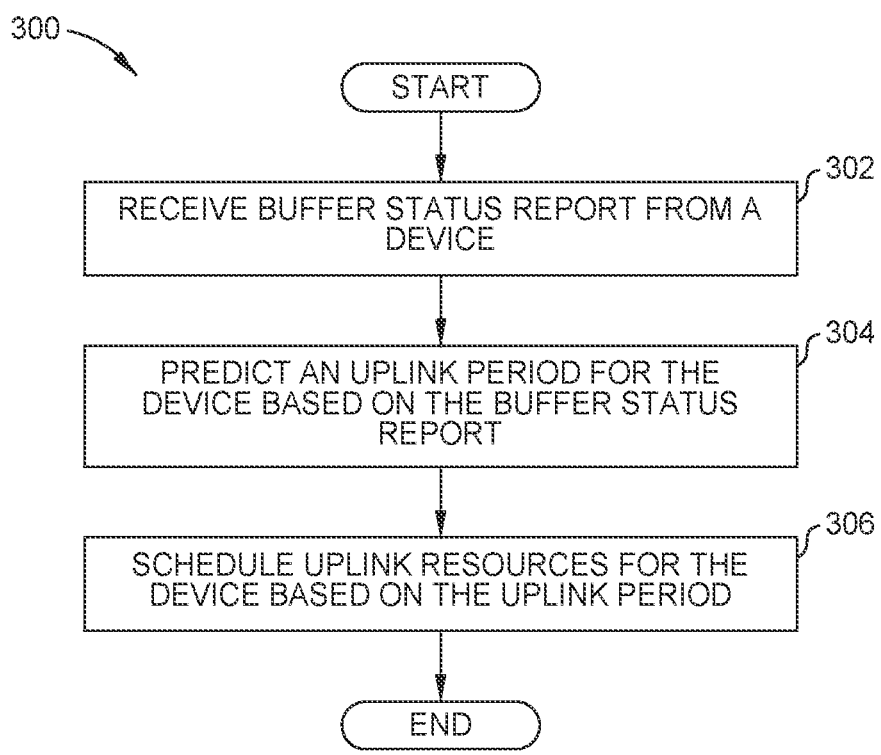
FIG. 3 is a flowchart of a process for scheduling uplink resources using the system of FIG. 1, according to one or more embodiments.

FIG. 3 is a flowchart of a process 300 for scheduling uplink resources 122 using the system 100 of FIG. 1, which may be an alternative or supplement to the process 200 for scheduling uplink resources 122 described in FIG. 2. Generally, the access point 108 performs the process 300. In particular embodiments, by performing the process 300, the access point 108 reduces delay and provides for a higher quality of service, especially for video and voice applications.

The access point 108 begins by receiving a BSR 116 from a device 102 in step 302. In some embodiments, the device 102 communicates the BSR 116 periodically. In some embodiments, the device 102 communicates the BSR 116 in response to a BSR request 114 communicated by the access point 108. The access point 108 may have communicated the BSR request 114 to the device 102 according to a particular polling frequency for the device 102.

In step 304, the access point 108 predicts an uplink period for the device 102 based on the BSR 116. For example, the access point 108 may assume based on information in the BSR 116 (e.g., the queue depth 118 and/or the HOL delay 120) that the device 102 transmits data periodically. The access point 108 may then predict that period. In step 306, the access point schedules uplink resources 122 for the device 102 based on the predicted uplink period. In this manner, the access point 118 provides uplink resources 122 for the device 102 without necessarily polling the device 102 each time uplink resources 122 are scheduled. For example, the access point 108 may assume from the BSR 116 that the device 102 transmits packets with a certain frequency or according to a certain period. In response, the access point 108 may schedule uplink resources 122 for the device 102 according to that frequency or period without polling the device 102 each time before scheduling uplink resources 122 for the device 102. In this manner, the access point 108 reduces the amount of network traffic associated with polling the device 102 (e.g., communicating BSR requests 114). In some embodiments, the access point 108 still communicates a BSR request 114 to the device 102 at less frequent intervals to check whether the device 102 has seen a change in resource demand and needs additional or fewer uplink resources 122.

Figure 4:
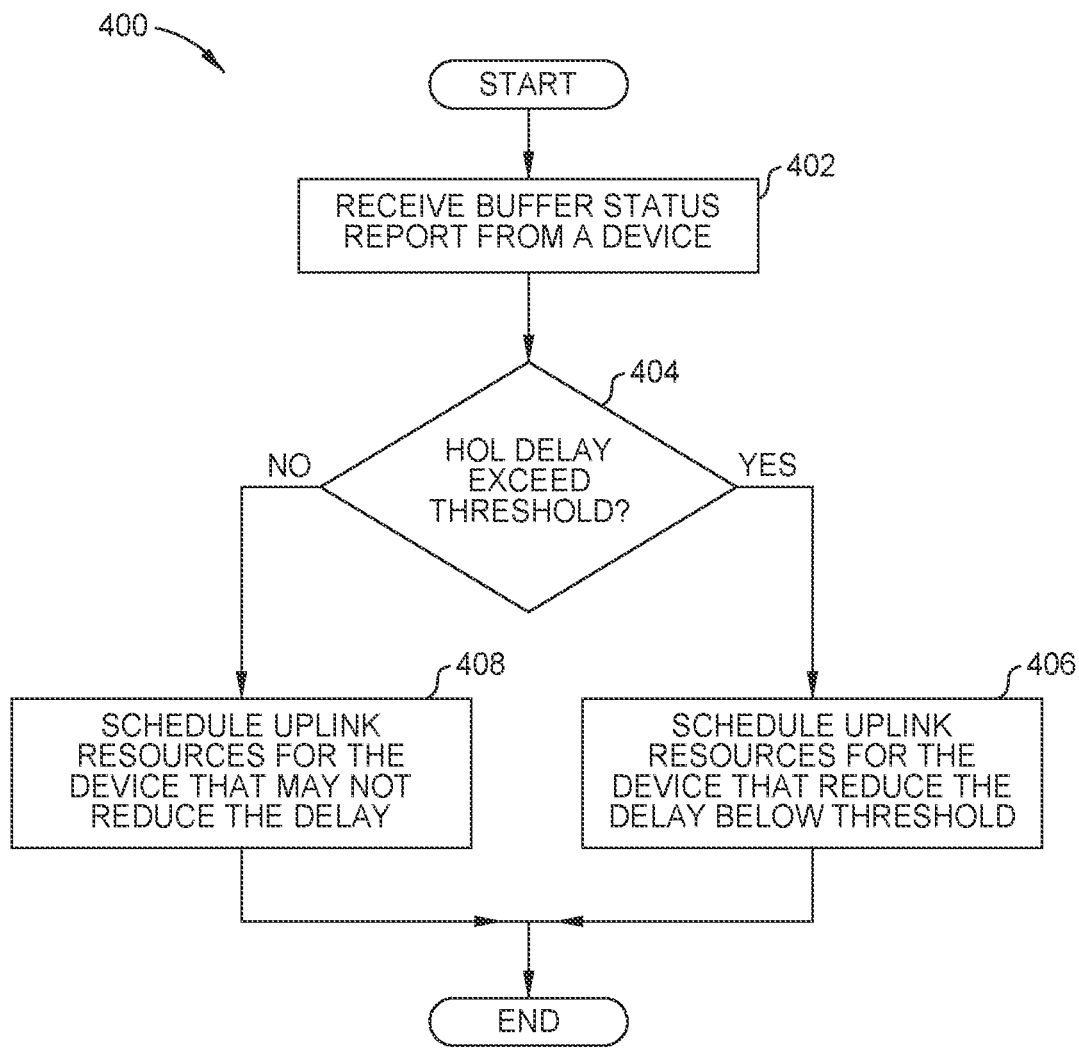
FIG. 4 is a flowchart of a process for scheduling uplink resources using the system of FIG. 1, according to one or more embodiments.

FIG. 4 is a flowchart of a process 400 for scheduling uplink resources 122 using the system 100 of FIG. 1, which may be an alternative or supplement to the process 200 for scheduling uplink resources 122 described in FIG. 2 or to the process 300 for scheduling uplink resources 122 described in FIG. 3. Generally, the access point 108 performs the process 400. In particular embodiments, by performing the process 400, the access point 108 reduces delay and provides for a higher quality of service, especially for video and voice applications.

The access point 108 begins by receiving a BSR 116 from a device 102 in step 402. In some embodiments, the device 102 communicates the BSR 116 periodically. In some embodiments, the device 102 communicates the BSR 116 in response to a BSR request 114 communicated by the access point 108. The access point 108 may have communicated the BSR request 114 to the device 102 according to a particular polling frequency for the device 102.

In step 404, the access point 108 determines whether a HOL delay 120 in the BSR 116 exceeds a threshold (e.g., whether a rate of increase or decrease of the HOL delay 120 exceeds a threshold rate or whether the HOL delay 120 exceeds a threshold delay). If the HOL delay 120 exceeds the threshold, the access point 108 schedules uplink resources 122 for the device 102 that reduce the HOL delay 120 below the threshold in step 406. For example, the access point may schedule additional amounts of uplink resources 122 for the device 102 so that the device 102 can transmit additional data 124 to the access point 108, thereby lowering the HOL delay 120. If the HOL delay 120 does not exceed the threshold, the access point 108 schedules uplink resources 122 for the device that may not reduce the HOL delay 120 in step 408. For example, the access point 108 may schedule an amount of uplink resources 122 that allows the device 102 to transmit sufficient data 124 to maintain the HOL delay 120. As another example, the access point 108 may schedule an amount of uplink resources 122 that allows the device 102 to transmit an amount of data 120 that causes HOL delay 120 to increase. Stated differently, if the HOL delay 120 exceeds a threshold, it may indicate that the device 102 has packets that have been delayed a long period of time. To provide a high quality of service to the device 102, the access point 108 may schedule more uplink resources 122 to the device 102 when the HOL delay 120 exceeds the threshold. As another example, if the HOL delay 120 does not exceed the threshold, it may indicate that the device 102 has sufficient uplink resources to handle the packet load at the device 102. In response, the access point 108 may not schedule additional uplink resources 122 for the device 102. By scheduling the uplink resources 122, the device 102 is allowed to transmit data 124 to the access point 108. The access point 108 then transmits the data 124 to other portions of the network according to the scheduled uplink resources.

By scheduling uplink resources 122 to a device 102 based on the HOL delay 120 and/or the queue depth 118 in a BSR 116 from the device 102, the access point 108 can provide a high quality of service even when the device 102 has a low queue depth 118. For example, the access point 108 may schedule uplink resources 122 to the device 102 when the BSR 116 indicates a high HOL delay 120 and a low queue depth 118, which may occur for video and voice applications. Conventional access points may not schedule uplink resources to the device 102 in these instances, which results in the voice and video packets to be delayed causing the quality of service to drop. On the other hand, the access point 108 considers the HOL delay 120 in scheduling uplink resources 122 and so a device 102 with high HOL delay 120 and a low queue depth 118 may still be scheduled uplink resources 122. As a result, the voice and video packets at the device 102 do not get delayed so as to cause the quality of service to drop in certain embodiments.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
receiving, at an access point, a buffer status report from a device wirelessly connected to the access point, the buffer status report indicating a queue depth of the device and a head of line delay for the device;
scheduling uplink resources at the access point for the device based on the queue depth and the head of line delay; and
increasing a buffer status report polling frequency for the device in response to determining that a head of line delay for the device is increasing over time.

2. The method of claim 1, further comprising determining that the head of line delay for the device is decreasing over time and in response, decreasing the buffer status report polling frequency for the device.

3. The method of claim 1, further comprising predicting, based at least in part on the buffer status report, an uplink period for the device, wherein scheduling the uplink resources for the device is further based on the predicted uplink period.

4. The method of claim 1, further comprising determining that the head of line delay exceeds a threshold, wherein the uplink resources are scheduled in response to determining that the head of line delay exceeds the threshold.

5. The method of claim 1, further comprising communicating, to the device, a buffer status report request according to a buffer status report polling frequency, wherein the buffer status report is received in response to the buffer status report request.

6. The method of claim 1, further comprising receiving video or voice data via the scheduled uplink resources.

7. An access point comprising:
a memory; and
a hardware processor communicatively coupled to the memory, the hardware processor configured to:
receive a buffer status report from a device, the buffer status report indicating a queue depth of the device and a head of line delay for the device;
schedule uplink resources for the device based on the queue depth and the head of line delay; and
increase a buffer status report polling frequency for the device in response to determining that a head of line delay for the device is increasing over time.

8. The access point of claim 7, the hardware processor further configured to determine that the head of line delay for the device is decreasing over time and in response, decrease the buffer status report polling frequency for the device.

9. The access point of claim 7, the hardware processor further configured to predict, based at least in part on the buffer status report, an uplink period for the device, wherein scheduling the uplink resources for the device is further based on the predicted uplink period.

10. The access point of claim 7, the hardware processor further configured to determine that the head of line delay exceeds a threshold, wherein the uplink resources are scheduled in response to determining that the head of line delay exceeds the threshold.

11. The access point of claim 7, the hardware processor further configured to communicate, to the device, a buffer status report request according to a buffer status report polling frequency, wherein the buffer status report is received in response to the buffer status report request.

12. The access point of claim 7, the hardware processor further configured to receive video or voice data via the scheduled uplink resources.

13. A system comprising:
a wireless device comprising a hardware processor configured to generate a buffer status report indicating a queue depth of the device and a head of line delay for the device; and
a wireless access point comprising a hardware processor configured to schedule uplink resources for the device based on the queue depth and the head of line delay and to increase a buffer status report polling frequency for the wireless device in response to determining that the head of line delay for the device is increasing over time.

14. The system of claim 13, the hardware processor of the access point further configured to determine that the head of line delay for the device is decreasing over time and in response, decreasing the buffer status report polling frequency for the device.

15. The system of claim 13, the hardware processor of the access point further configured to predict, based at least in part on the buffer status report, an uplink period for the device, wherein scheduling the uplink resources for the device is further based on the predicted uplink period.

16. The system of claim 13, the hardware processor of the access point further configured to determine that the head of line delay exceeds a threshold, wherein the uplink resources are scheduled in response to determining that the head of line delay exceeds the threshold.

17. The system of claim 13, the hardware processor of the access point further configured to communicate, to the device, a buffer status report request according to a buffer status report polling frequency, wherein the buffer status report is received in response to the buffer status report request.

* * * * *